May 30, 1944. H. F. PITCAIRN 2,350,126
HELICOPTER
Filed Dec. 4, 1941
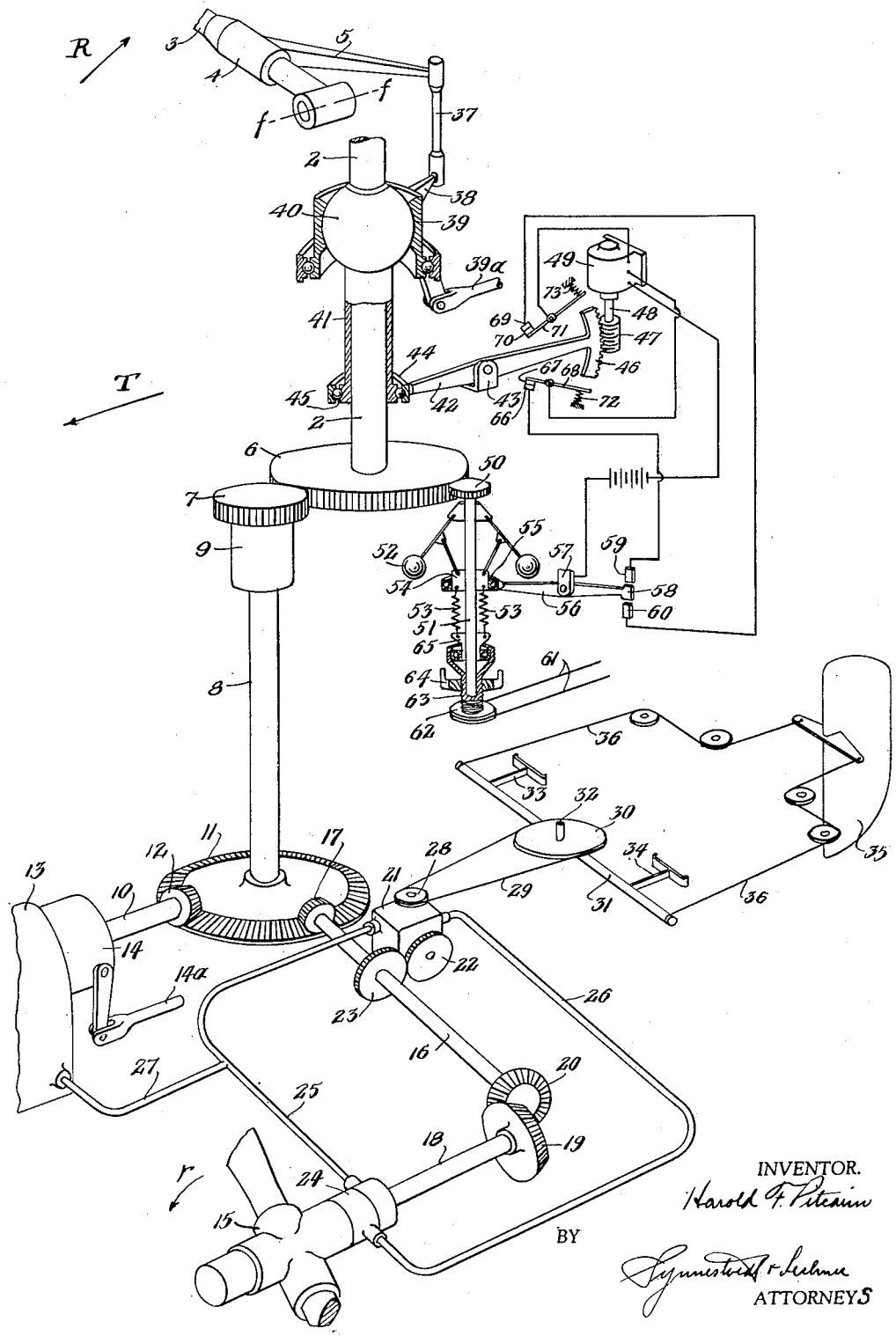
INVENTOR.
Harold F. Pitcairn
BY
ATTORNEYS Patented May 30, 1944

2,350,126

UNITED STATES PATENT OFFICE 2,350,126

HELICOPTER

Harold F. Pitcairn, Bryn Athyn, Pa., assignor to Autogiro Company of America, Philadelphia, Pa., a corporation of Delaware Application December 4, 1941, Serial No. 421,529

15 Claims. (Cl. 244—17)

This invention relates to an aircraft, generally of the helicopter type, having a sustaining rotor adapted to be power driven at least under some normal flight conditions. More particularly, the invention is concerned with a helicopter equipped with a propulsion airscrew having its axis offset toward that side of the craft on which the rotor blades advance during translational flight, so that the airscrew not only provides propulsive thrust but also serves to counteract the rotor driving torque. A machine of this general type is disclosed in copending application of James A. J. Bennett, Serial No. 353,810, filed August 23, 1940, issued as Patent 2,317,340, April 27, 1943.

Although the invention is particularly suitable to an aircraft of the kind above described having only a single sustaining rotor and only a single propulsive airscrew, it may here be mentioned that at least most features of the invention are also applicable to a similar machine having more than one airscrew, in which event the several propulsive airscrews would be arranged so that the mean thrust thereof (at least when the rotor is power driven) is offset from the rotor axis in a direction providing for counteraction of the rotor driving torque. Moreover, the invention may even be used where the aircraft is equipped with more than one sustaining rotor, wherever the rotor arrangement is such as to set up an unbalanced torque moment when the rotors are being driven.

Preferably, the type of aircraft to which the invention is applied is such that the sustaining rotor may alternatively be power driven or freely rotative (autorotative) at least for descent without power.

With the foregoing general field of the invention in mind, it is now pointed out that the arrangement herein contemplated has especial reference to helicopters falling within that general field and in which provision is made for variation of mean pitch of the rotor and also of the airscrew, one of the objects being improvement of pitch control, as will further appear.

In accordance with one aspect of the invention, independent R. P. M.-responsive pitch-control governors are associated, respectively, with the rotor and the airscrew, provision being made for independent adjustment of the equilibrium settings of the two governors.

In addition to the foregoing, the invention contemplates a pilot operated control for varying the equilibrium setting of the airscrew governor, the control preferably taking the form of one of the major flight control organs, such as a rudder bar (or rudder pedals), so that this adjustment may serve for steering as well as for regulation of the effect of the airscrew in counteracting the rotor driving torque.

In accordance with this invention, the pilot operated control just referred to is operative to vary the mean pitch of the airscrew substantially independently of the rotor blade pitch angle, and also independently of the rotor blade pitch control governor. Still further, the invention contemplates that the pilot operated rudder bar (or equivalent control) shall also be coupled with a controllable rudder. With the rudder bar coupled with the rudder as well as with the airscrew governor, adequate directional control may be secured under all flight conditions, including high speed translational flight, hovering and descent with or without power being delivered to the rotor.

Another phase of the invention has relation to the pitch-control governor for the rotor, novel mechanism being provided for this purpose, including a reversible rotative motor, preferably an electric motor, a worm and worm wheel connection between the motor and the rotor blades, a reversing switch, and a centrifugal governor coupled with said switch; all of these parts being arranged to provide accurate pitch control in the manner hereinafter fully set out, while restraining the transmission of aerodynamically induced forces from the rotor blades, back through the operating and control system, to the governor.

How the foregoing objects and advantages are attained, together with others which will occur to those skilled in the art, will be apparent from the following description, referring to the accompanying drawing.

The single figure of the drawing is a schematic view of portions of a rotor hub, a rotor blade, an airscrew, a power plant, power transmission devices, and the control organs and mechanisms provided in accordance with this invention.

Referring now to the several parts shown in the drawing, the numeral 2 designates the rotor spindle or hub shaft, to which the blades, a portion of one of which appears at 3, are connected. Each blade is preferably articulated to the hub, the articulation including at least a flapping pivot, the axis of which is indicated at *f—f*. Each blade further has a pitch change mounting indicated at 4, providing freedom for movement of the blade about its longitudinal axis, such movement being controllable through an arm 5, as described hereinafter.

The hub spindle 2 is adapted to be driven through gearing 6—7, gear 7 receiving power from shaft 8, preferably through an overrunning clutch enclosed at 9. Shaft 8, in turn, is connected with power shaft 10 through gearing 11—12, shaft 10 being driven from engine 13 through a manually controllable clutch 14 having operating linkage 14a.

The engine also serves to drive the propulsive airscrew 15, for which purpose a shaft 16 is provided with a gear 17 meshing with gear 11, the propeller shaft 18 being coupled with shaft 16 through bevel gearing 19—20.

In considering the drawing, it should be kept in mind that the rotor is generally centralized over the body of the aircraft and that the airscrew 15 is offset toward that side of the aircraft on which the rotor blades 3 advance into the flight wind during translational flight. The direction of translation is indicated in the drawing by the arrow T, the directions of rotation of the rotor and airscrew being indicated by the arrows R and r. As disclosed in the aforementioned copending Bennett application, the extent of offset of the airscrew is preferably such that the thrust of the airscrew in normal translational flight approximately counteracts the rotor driving torque. Such torque counteraction, of course, is only approximate and does not represent the exact value required under most flight conditions, so that controllable means are necessary in order to maintain any desired position of the aircraft in yaw.

In accordance with the present invention, independent R. P. M.-responsive pitch-control governors are associated, respectively, with the rotor and with the airscrew, and provision is made for manually controlling the airscrew thrust, whereby to afford adequate control in yaw, and thus enable the maintenance of any desired course in flight.

The airscrew governor 21 which, per se, may be of known fluid pressure type, is provided with a driving connection 22—23 with shaft 16 of the propeller drive. The governor 21 is coupled with the pitch control mechanism 24 of the airscrew through pipes 25 and 26, the governor being supplied with actuating fluid through pipe 27 from a suitable source, such as the normal lubrication pump for the engine. As is known, this type of airscrew pitch-control governor is arranged to maintain substantially constant engine speed by increase of airscrew pitch upon increase of engine speed, and decrease of airscrew pitch upon decrease of engine speed. In accordance with the invention, the equilibrium setting of the governor is adjustable by means of a pulley 28 which is coupled by belt 29 with pulley 30, the latter pulley being connected with the rudder bar 31 and adapted to move therewith when the rudder bar is displaced about its pivot 32. The bar 31 may be actuated by the pilot through the medium of pedals 33—34.

In addition to its connection with the pitch-control governor 21, the rudder bar 31 is also coupled with the rudder 35. This coupling of the rudder and rudder bar may be provided for in any conventional way, as by the cables 36. When coupled up as indicated, it will be seen that forward movement of the right rudder pedal 33 will deflect the rudder 35 in that direction causing the machine to turn to the right. This movement of the rudder bar also adjusts the pitch-control governor in that sense tending to increase the thrust of the airscrew 15. Such increase in thrust is brought about by increasing the mean pitch of the airscrew 15, the effect of which is to cause the airscrew speed to stabilize at a lower R. P. M. (assuming that the displacement of the rudder pedal is maintained for a sufficient period of time to permit stabilization at the new adjusted setting).

The foregoing deflection of the rudder 35 and the accompanying response of the pitch-control governor 21 is, of course, inverted upon movement of the left rudder pedal 34 forwardly. Moreover, the action described is interrelated with the action of the rotor and its pitch-control governor in a manner which will be brought out more fully hereinafter following description of the rotor governor.

As hereinbefore mentioned, the pitch angle of the blades 3 is adapted to be varied by movement of the control arms 5. For this purpose, each arm 5 is flexibly connected with a link 37, also flexibly connected with arm 38 projecting from a swash member 39 rotative with the rotor and mounted for universal tilting movement on the ball 40. Tilting of the swash member 39 may be employed to impose periodic differential pitch change upon the blades so as to shift the left line of the rotor and thereby secure control moments in pitch and roll, in the general manner disclosed in copending application of Juan de la Cierva Serial No. 698,372, filed November 16, 1933. Since this control system forms no part of the invention per se, it is not described in detail herein, although it is noted that one of the control connections for this purpose is indicated at 39a. Alternatively, other known means may be provided for securing control in pitch and roll, such as hub tilting in accordance with copending Cierva application Serial No. 645,985, filed December 6, 1932.

Ball 40 is carried by sleeve 41, which is vertically movable with respect to the rotor shaft 2, so that the ball 40 and swash member 39 may be displaced upwardly or downwardly to change the pitch of all blades in the same sense. Vertical movement of tube 41 may be effected by means of a lever 42 which is pivoted in a fixed bracket 43 intermediate its ends. One end of this lever is connected with a ring 44 mounted on the lower end of tube 41 by means of a bearing 45. At its other end, lever 42 carries a segment 46 of a worm wheel, positioned to mesh with worm 47 carried by shaft 48 of the reversible electric motor 49. This worm-actuating means is irreversible, i. e., will prevent transmission of forces therethrough in a direction from the blades to the governor now to be described.

Control of the motor is secured from a centrifugal governor driven by a gear 50 which meshes with rotor driving gear 6. The governor shaft 51 carries weights 52 which are mounted for radial displacement against the action of springs 53. Increase in rotational speed causes the member 54 to move upwardly on shaft 51, carrying with it (by means of a suitable bearing) the non-rotative ring 55 to which one end of a lever 56 is attached. The lever 56 is pivotally mounted at 57 intermediate its ends, and the outer end of this lever carries an electrical contact 58 disposed intermediate a pair of contacts 59 and 60.

Contacts 58, 59 and 60 serve as a reversing switch for motor 49 in a manner well understood in the art. It should here be mentioned that the contacts 59 and 60 are desirably spaced somewhat away from the central contact 58, when the latter is in mid position, so as to provide a limited range of variation in rotor R. P. M. without actuation of the pitch changing motor 49. Such spacing will also avoid undesired "hunting" of the control governor under the influence of minor variations in rotor R. P. M. It is contemplated that the spacing of contacts 59 and 60 may be adjusted so as to control the intermediate range of rotor R. P. M. permitted without pitch change.

The rotor governor provides for increase of mean rotor blade pitch angle upon increase of rotor R. P. M., and decrease of mean rotor blade pitch upon decrease of rotor R. P. M. The equilibrium setting of the governor is adjustable through any suitable manual control organ (not shown) coupled with the cable 61 which engages pulley 62 rigid with sleeve 63 which is threaded into a fixed supporting bracket 64. The sleeve 63 is flared toward its upper end to cooperate with member 65 to which the governor springs 53 are attached. A suitable bearing is, of course, interposed between the sleeve and member 65. The governor, therefore, provides for maintenance of a substantially uniform rotor R. P. M., in accordance with the selected equilibrium setting.

The control circuits for the motor 49 further incorporate "limit" switches for stopping operation of the motor at points corresponding to the maximum and minimum pitch settings desired under any conditions. Thus, switch contacts 66—67 serve to break that circuit of the motor which is effective to move the gear segment 46 downwardly. For this purpose contact 67 is mounted toward one end of a switch lever 68 pivoted intermediate its ends, the free end of the lever being positioned so that downward movement of segment 46 will abut the lever and thus separate contacts 66 and 67. The adjustment of these parts is such that increase of mean rotor blade pitch angle will be arrested at a limit defining or just above the maximum desired under any conditions.

On the other hand, switch contacts 69—70 are introduced in the other circuit of motor 49, contact 70 being carried by switch lever 71 arranged in a manner similar to that described above, with one end positioned to be operated by gear segment 46 when the latter moves upwardly. The adjustment of these parts is such that upon decrease of rotor R. P. M. (appreciable decrease following cessation of rotor drive), the circuit will be broken at contacts 69—70 at a point defining an autorotational pitch setting for the rotor. With this arrangement, upon engine failure, the decrease in rotor R. P. M. will automatically bring about a predetermined autorotational pitch setting suitable for flight without delivery of power to the rotor.

In the event of operation of either one of the limit switches, the R. P. M. of the rotor may deviate still further in the corresponding direction, without effecting further pitch change. However, since the R. P. M. again returns to a point in the normal intermediate range, the centrifugal governor will restablish operation of motor 49 in the appropriate direction to again bring the mean pitch value into the normal intermediate range. Compression springs 72 and 73 normally maintain contacts 66—67 and 69—70 in engagement with each other, and thus assure operation in the manner just described.

Since the equilibrium setting of the governor may be adjusted (through the medium of cable 61) and since provision is also made for adjusting the airscrew governor 21, the pilot may meet a wide variety of operating conditions. Thus, proper torque counteraction is obtainable with different engine-throttle settings and also throughout a wide range of translational flight speeds, as well as in hovering or vertical descent (with or without power drive of the rotor).

In addition to the above functions of the pitch control mechanisms, the rudder bar, which is connected with the airscrew governor, may at all times be employed to provide accurate adjustment of the torque counteractive effect of the airscrew thrust. The sense in which the rudder bar is coupled with the airscrew governor is such that the pilot instinctively actuates the rudder bar in the correct direction, i. e., that direction which is required to increase the airscrew thrust when the machine turns to the left, and decrease the airscrew thrust when the machine turns to the right.

For the purpose of analyzing the control of the torque counteracting effect, assume, for example, that for some cause the rotor torque has momentarily increased, thereby tending to turn the machine to the left. To correct for this, the pilot will move the right-hand rudder pedal 33 forwardly, thereby not only deflecting the rudder 35 in the corrective sense, but also adjusting the equilibrium setting of the airscrew pitch governor 21 in a direction resulting in increase of mean airscrew pitch and, therefore, increase in thrust of the airscrew. Because of the increase of airscrew pitch the airscrew now takes a greater proportion of the total power output of the engine and continuance of operation under this condition for any appreciable interval will result in decrease of both the airscrew and the rotor R. P. M. In turn, such decrease in rotor R. P. M. will actuate the rotor governor to decrease the mean rotor blade pitch angle and thus decrease the rotor driving torque.

In the above example, the initial response of the airscrew governor (increase of pitch and thrust of the airscrew) may under many conditions be sufficient to compensate for a momentary increase in rotor driving torque, but if the increase in rotor driving torque is of considerable magnitude, the slowing down of the rotor will actuate the rotor governor so as to reduce the rotor blade pitch angle and thereby ensure complete compensation even for a major fluctuation in rotor driving torque. The spacing (above described) of the contacts of the motor reversing switch serves to delay actuation of the motor, and thereby provides a limited time interval during which the corrective effect of airscrew thrust variation may be felt.

The control would, of course, operate in a similar manner, but in the opposite sense, at times when a momentary decrease in rotor driving torque occurs.

Finally, it may be pointed out that the rotor governor and associated controls are arranged so that in the event of engine failure (or at any time when the rotor is not being power driven) the resultant decrease in rotor R. P. M. will bring the mean rotor blade pitch angle to a value effective for autorotational actuation of the rotor. Thus, if the engine fails, the control will automatically condition the rotor for safe descent.

I claim:

1. In an aircraft, a variable pitch bladed sustaining rotor adapted to be driven through its hub, a variable pitch airscrew with its axis offset from the rotor axis and arranged to counteract the rotor driving torque, independent R. P. M.-responsive pitch-control governors associated respectively with the rotor and airscrew, and pilot operated control means for adjusting the equilibrium setting of at least one of said governors.

2. A construction in accordance with claim 1 in which the pilot operated control means is associated with the airscrew pitch-control governor.

3. A construction in accordance with claim 1 in which the pilot operated control means is associated with the airscrew pitch-control governor and comprises foot-operated means, and in which the aircraft further incorporates a controllable rudder, coupled with said foot-operated means.

4. A construction in accordance with claim 1 in which separately operable control means are associated respectively with said pitch-control governors.

5. In an aircraft, a variable pitch bladed sustaining rotor adapted to be driven through its hub, a variable pitch airscrew with its axis offset from the rotor axis and arranged to counteract the rotor driving torque, independent R. P. M.-responsive pitch-control governors associated respectively with the rotor and the airscrew, and means for independently regulating the equilibrium settings of said governors.

6. In an aircraft, a variable pitch bladed sustaining rotor adapted to be driven through its hub, a variable pitch airscrew with its axis offset from the rotor axis and arranged to counteract the rotor driving torque, control means for adjusting the airscrew pitch so as to alter the torque counteractive effect of the airscrew thrust, and mechanism for regulating the mean rotor blade pitch angle independently of the airscrew pitch including a R. P. M.-responsive governor operative to increase the mean rotor blade pitch angle upon increase in rotor R. P. M. and to decrease the mean rotor blade pitch angle upon decrease in rotor R. P. M., said governor being constructed to provide a limited intermediate range of variation in rotor R. P. M. without varying the mean motor blade pitch angle.

7. In an aircraft, a variable pitch sustaining rotor system so arranged that when power driven an appreciable countertorque is set up in the body of the aircraft, variable pitch airscrew means for the aircraft with the mean thrust line thereof disposed so as to simultaneously counteract rotor driving torque and provide a propulsion force for translational flight, control mechanism for the airscrew pitch providing for variation in the thrust of the airscrew means to alter the torque counteractive effect thereof, and a rotor pitch governor operative to vary the mean rotor pitch independently of the airscrew pitch, said governor being responsive to increase and decrease in rotor R. P. M. to increase and decrease the mean rotor blade pitch angle, respectively.

8. A construction in accordance with claim 7 in which the control mechanism for the airscrew pitch comprises a governor operative to stabilize the airscrew R. P. M. by decreasing the airscrew pitch upon decrease of airscrew R. P. M., and vice versa, and pilot operated means for adjusting the equilibrium speed at which the airscrew R. P. M. is stabilized.

9. In an aircraft, a variable pitch bladed sustaining rotor adapted to be driven through its hub, a variable pitch airscrew with its axis offset from the rotor axis and arranged to counteract the rotor driving torque, R. P. M.-responsive pitch governor means for the rotor and airscrew, and means for adjusting the equilibrium speed of the governor means for the rotor independently of the airscrew.

10. In an aircraft, a variable pitch bladed sustaining rotor adapted to be driven through its hub, a variable pitch airscrew with its axis offset from the rotor axis and arranged to counteract the rotor driving torque, R. P. M.-responsive mechanism for regulating the mean pitch of the rotor and of the airscrew, a pilot operated control associated with said mechanism and providing for adjustment of the airscrew pitch at will, and means for adjusting the equilibrium setting of said regulating mechanism and providing for variation of the equilibrium speed of the rotor.

11. A construction in accordance with claim 1 in which the airscrew has its axis offset from the rotor axis toward that side on which the blades advance during translational flight, whereby to utilize the thrust of the airscrew for propulsion as well as for counteraction of the rotor driving torque.

12. A construction in accordance with claim 6 in which the airscrew has its axis offset from the rotor axis toward that side on which the blades advance during translational flight, whereby to utilize the thrust of the airscrew for propulsion as well as for counteraction of the rotor driving torque.

13. A construction in accordance with claim 9 in which the airscrew has its axis offset from the rotor axis toward that side on which the blades advance during translational flight, whereby to utilize the thrust of the airscrew for propulsion as well as for counteraction of the rotor driving torque.

14. A construction in accordance with claim 10 in which the airscrew has its axis offset from the rotor axis toward that side on which the blades advance during translational flight, whereby to utilize the thrust of the airscrew for propulsion as well as for counteraction of the rotor driving torque.

15. For an aircraft having a variable pitch sustaining rotor adapted to be power driven through its hub, mechanism for regulating the mean rotor blade pitch angle including a governor responsive to variation in rotor R. P. M., motor means for increasing or decreasing the mean rotor blade pitch angle in accordance with the operation of said governor, said motor means being arranged to increase the rotor blade pitch angle with increase in rotor R. P. M. and to decrease the rotor blade pitch angle with decrease in rotor R. P. M., and mechanism for rendering the motor means ineffective to vary the mean rotor blade pitch angle beyond the limits of a predetermined range, of which range one of the limits corresponds to an autorotative pitch setting.

HAROLD F. PITCAIRN.

CERTIFICATE OF CORRECTION.

Patent No. 2,350,126.  May 30, 1944.

HAROLD F. PITCAIRN.

It is hereby certified that error appears in the printed specification of the above numbered patent requiring correction as follows: Page 2, second column, line 24, for "left line" read --lift line--; page 3, first column, line 67, for "restablish" read --reestablish--; page 4, first column, line 4, claim 1, before "airscrew" insert --the--; and that the said Letters Patent should be read with this correction therein that the same may conform to the record of the case in the Patent Office.

Signed and sealed this 25th day of July, A. D. 1944.

Leslie Frazer

(Seal) Acting Commissioner of Patents.